United States Patent
Puszkiewicz et al.

(10) Patent No.: US 10,545,737 B2
(45) Date of Patent: Jan. 28, 2020

(54) MODEL BINDING FOR COMMAND LINE PARSERS

(71) Applicant: Microsoft Technology Licensing, LLC, Redmond, WA (US)

(72) Inventors: Piotr Milosz Puszkiewicz, Seattle, WA (US); Jon Gregory Sequeira, Seattle, WA (US); Livar Correia de Oliveira Cavalcanti Cunha, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 15/621,899

(22) Filed: Jun. 13, 2017

(65) Prior Publication Data
US 2018/0357051 A1 Dec. 13, 2018

(51) Int. Cl.
*G06F 8/41* (2018.01)
(52) U.S. Cl.
CPC .................... *G06F 8/427* (2013.01)
(58) Field of Classification Search
CPC ............... G06F 8/20–78; G06F 8/423–427
USPC .................................................. 717/141–143
See application file for complete search history.

(56) References Cited

U.S. PATENT DOCUMENTS

| | | | |
|---|---|---|---|
| 5,964,844 A * | 10/1999 | Rosenthal | G06F 9/451 |
| | | | 719/310 |
| 7,478,380 B2 * | 1/2009 | Schmidt | G06F 9/45512 |
| | | | 709/223 |
| 7,594,170 B2 | 9/2009 | Snover et al. | |
| 8,347,265 B1 | 1/2013 | Sirianni | |
| 9,244,706 B2 | 1/2016 | Calev et al. | |
| 9,348,805 B1 | 5/2016 | Uszkoreit et al. | |
| 9,501,449 B2 * | 11/2016 | Harsha | G06F 8/45 |
| 9,619,210 B2 * | 4/2017 | Kent, IV | G06F 17/30368 |
| 2003/0135508 A1 * | 7/2003 | Chorafakis | G06F 8/51 |
| 2004/0230987 A1 * | 11/2004 | Snover | G06F 9/45512 |
| | | | 719/320 |

(Continued)

OTHER PUBLICATIONS

Picocli—a mighty tiny command line interface—Version 0.9.7, Jun. 8, 2017, 88 pages, [retrieved on Sep. 5, 2019], Retrieved from the Internet.*

(Continued)

*Primary Examiner* — Geoffrey R St Leger
(74) *Attorney, Agent, or Firm* — Ogilvie Law Firm

(57) ABSTRACT

The design, creation, use, and execution of command line parsers based on subcommand classes instead of boilerplate code is described. Commands and subcommands have corresponding class definitions, which upon instantiation based on command line content will provide and execute code to perform the command. Subcommand dispatching may be accomplished using delegates, using an interface implementation, or otherwise. Class attributes may define help text, argument aliases, and other metadata. Subcommand types may be passed as generic arguments, as objects, or otherwise. Arguments may be made optional or be required by providing or omitting class constructor parameter default values. By using classes to implement subcommands and avoiding reliance on large error-prone if or switch statements, parser development is made easier and more efficient.

20 Claims, 8 Drawing Sheets

(56) References Cited

U.S. PATENT DOCUMENTS

| | | | | |
|---|---|---|---|---|
| 2005/0060693 | A1* | 3/2005 | Robison | G06F 9/45512 717/143 |
| 2006/0129980 | A1* | 6/2006 | Schmidt | G06F 9/45512 717/114 |
| 2006/0197967 | A1* | 9/2006 | Snover | G06F 9/45512 358/1.13 |
| 2008/0046861 | A1* | 2/2008 | Grieser | G06Q 10/10 717/104 |
| 2009/0172541 | A1* | 7/2009 | Acedo | G06F 9/45512 715/708 |
| 2013/0282748 | A1 | 10/2013 | Liensberger et al. | |
| 2014/0074576 | A1 | 3/2014 | Mall et al. | |
| 2015/0074257 | A1* | 3/2015 | Harsha | G06F 8/45 709/223 |
| 2016/0070454 | A1 | 3/2016 | Daley et al. | |
| 2016/0292218 | A1 | 10/2016 | Puszkiewicz et al. | |
| 2016/0335057 | A1* | 11/2016 | Teodorescu | G06F 17/30368 |
| 2017/0147681 | A1* | 5/2017 | Tankersley | G06Q 10/00 |
| 2017/0351646 | A1* | 12/2017 | White | G06F 3/04812 |

OTHER PUBLICATIONS

Dynamically adding external subcommands to custom command system, spigotmc.org, Oct. 2016, 9 pages, [retrieved on Sep. 5, 2019], Retrieved from the Internet.*

Sub-Commands in Different Classes, bukkit.org, Dec. 7, 2013, 5 pages, [retrieved on Sep. 5, 2019], Retrieved from the Internet.*

How can I create sub commands in different classes?, spigotmc.org, Jan. 2017, 9 pages, [retrieved on Sep. 5, 2019], Retrieved from the Internet.*

Ronacher, A., click documentation Release 1.0, Feb. 8, 2017, 105 pages, [retrieved on Sep. 5, 2019], Retrieved from the Internet.*

Lawrence, M., OptArgs—integrated argument and option processing version 0.1.20, Apr. 11, 2016, 12 pages, [retrieved on Sep. 5, 2019], Retrieved from the Internet.*

Samyn, Marcel, "Creating Neat .NET Core Command Line Apps", https://gist.github.com/iamarcel/8047384bfbe9941e52817cf14a79dc34, Retrieved on: May 11, 2017, 4 pages.

"Java Program Invocation and Command-Line Arguments", http://users.cms.caltech.edu/~donnie/cs11/java/java-main.html, 2008, 3 pages.

"Command-line interface", https://en.wikipedia.org/wiki/Command-line_interface, May 18, 2017, 17 pages.

"Git commands and experiments", https://gist.github.com/talonendm/64d3613f3835e6a1d1adb40274a91dd7#file-git-commands-and-experiments-L24, Jul. 5, 2016, 5 pages.

Cedric Beust, "JCommander", http://jcommander.org/, May 2, 2017, 25 pages.

Tomasz Dziurko, "JCommander—parsing command line parameters with ease", http://tomaszdziurko.com/2012/05/icommander-parsing-command-line-parameters-ease/, 2012, 11 pages.

Alin Prebeagu, "Model Binding in asp.net MVC", https://assist-software.net/snippets/model-binding-aspnet-mvc, Mar. 27, 2017, 7 pages.

"Model-view-controller", https://en.wikipedia.org/wiki/Model%E2%80%93view%E2%80%93controller, May 5, 2017, 4 pages.

"16.4. argparse—Parser for command-line options, arguments and sub-commands", https://docs.python.org/3.3/library/argparse.html, retrieved May 12, 2017, 41 pages.

"Diference between copy run star and write mem on Views (RBAC)", https://learningnetwork.cisco.com/thread/61074, Sep. 14, 2013, 3 pages.

"Convert String to SomeType in Java", http://stackoverflow.com/questions/24716693/convert-string-to-sometype-in-lava, Jul. 12, 2014, 3 pages.

"Strategy pattern", https://en.wikipedia.org/wiki/Strategy_pattern, May 8, 2017, 7 pages.

"Field-programmable gate array", retrieved from <<https://en.wikipedia.org/wiki/Field-programmable_gate_array>>, Jun. 24, 2019, 10 pages.

"Systolic array", retrieved from <<https://en.wikipedia.org/wiki/Systolic_array>>, May 6, 2019, 5 pages.

"Lexical analysis", retrieved from <<https://en.wikipedia.org/wiki/Lexical_analysis>>, Jun. 1, 2019, 11 pages.

"Compiler-compiler", retrieved from <<https://en.wikipedia.org/wiki/Compiler-compiler>>, Jun. 5, 2019, 11 pages.

"Instance (computer science)", retrieved from <<https://en.wikipedia.org/wiki/Instance_(computer_science)>>, Oct. 19, 2018, 1 page.

"Object-oriented programming", retrieved from <<https://en.wikipedia.org/wiki/Object-oriented_programming>>, Jun. 27, 2019, 14 pages.

"Class-based programming", retrieved from <<https://en.wikipedia.org/wiki/Class-based_programming>>, Oct. 1, 2018, 3 pages.

"Constructor (object-oriented programming)", retrieved from <<https://en.wikipedia.org/wiki/Constructor_(object-oriented_programming)>>, Jul. 2, 2019, 16 pages.

"Command-line interface", retrieved from <<https://en.wikipedia.org/wiki/Command-line_interface>>, Jul. 1, 2019, 16 pages.

"Default (computer science)", retrieved from <<https://en.wikipedia.org/wiki/Default_(computer_science)>>, Jan. 24, 2019, 3 pages.

Jeff Overbey, "Lexical Analysis", retrieved from <<http://blog.jeff.over.bz/compilers/lexers/2017/09/09/lexical-analysis.html>>, Sep. 9, 2017, 8 pages.

"Flex (lexical analyser generator)", retrieved from <<https://en.wikipedia.org/wiki/Flex_(lexical_analyser_generator)>>, May 5, 2019, 4 pages.

"Subroutine", retrieved from <<https://en.wikipedia.org/wiki/Subroutine>>, Jul. 4, 2019, 16 pages.

"Generic programming", retrieved from <<https://en.wikipedia.org/wiki/Generic_programming>>, Jul. 5, 2019, 22 pages.

* cited by examiner

MODEL BINDING FOR COMMAND LINE PARSERS

BACKGROUND

Many computer programs interface directly with humans, and many interface directly with other programs. Some do both. Among programs that interface directly with humans, some programs are used primarily by experts in computing science or another technical field, while other programs are used primarily by people who are not expert, so far as computer program interactions are concerned, although they may be experts in other ways.

Interfaces for such computing non-experts often include graphical user interface components such as drop-down menus, buttons, scroll bars, sliders, resizable windows, use of color as an indicator, and some kind of pointer device mechanism such as a mouse, stylus, or touch screen. Due to rendering differences, constrained navigation paths and I/O options, and other differences, such graphical user interfaces are often difficult to automate. A particular sequence of instructions to a graphical user interface may be captured or stored as a sequence of pointer device movements that depend heavily on particular screen renderings that determine the location of menus, buttons, click or drag locations, and other components and interactions.

One widely used kind of expert program interface is the "command line interface", also known as a "console user interface". The interface is provided by a program that is called a "command line interpreter", "command language interpreter", or "shell" in some situations. This program presents a textual prompt. The user, who can be either a human or another program, supplies a textual command line in response to the prompt. The command line text typically begins with the name of a command, which is a program in its own right, and the command line often includes textual arguments to the command. Arguments recognized by a command may include subcommands which in turn have their own set of recognized arguments. In many cases, arguments may be either optional or required. The number of different valid command lines possible on a given commercial or academic or institutional system often numbers in the tens of thousands or even more.

SUMMARY

All of the technologies presented herein relate to command line parsing. Some technologies described are directed to technical activities performed by an executing command in order to parse a command line using instantiations of subcommand objects. Some teachings are directed to developer activities which define and place within a source code context developer-specified definitions of subcommand classes, constructor calls, default values, and other program development artifacts; these artifacts are compiled when a command and its command line parser are subsequently built from the source code. Some teachings are directed at the command building activity itself. Other technical activities pertinent to teachings herein will also become apparent to those of skill in the art.

Some examples provided herein are directed to command line parsing tools or techniques which provide or use subcommand class definitions in a command line parser. The command line parser parses command lines, including subcommands which are arguments to a command and which have their own respective subcommand arguments, without requiring difficult-to-maintain and error-prone boilerplate command line parsing code. Some examples discussed herein match a textual command argument to a subcommand class name and thus to a subcommand class. Some invoke a constructor of a matched subcommand class to instantiate a subcommand class object, and then dispatch processor control to a subcommand execution code of the subcommand class object to thereby execute the subcommand in question.

Different examples provided herein give various perspectives on command line parsing, such as the perspective of a developer or a system. Different examples also discuss different activities, such as (a) specifying a command line parser by providing suitable source code with subcommand class definitions and constructor calls, (b) building a command with a command line parser that includes compiled subcommand class definitions and constructor calls, and (c) executing such a subcommand-class-based command line parser.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Figure 1:
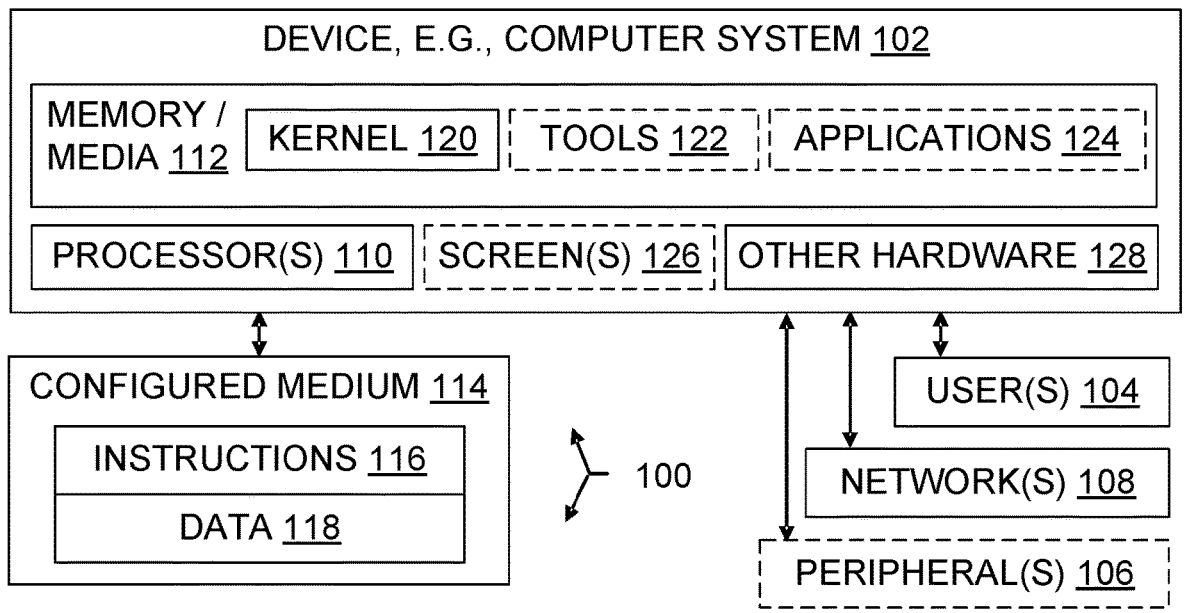
FIG. 1 is a block diagram illustrating a computer system having at least one processor, at least one kernel such as an operating system, and at least one memory, which interact with one another, and also illustrating a configured storage medium.

An Overview of Parsing and Model Binding

Command line parsing involves correctly mapping a given member of a varied and large set of syntactically correct command line strings to a matching collection of one or more subcommands and possibly other arguments. Command line parsing may also involve giving helpful errors when the textual input can't be parsed into a valid internal representation, e.g., if option -i requires an integer and a user passes a string of letters, then parsing may inform the user what they did wrong. A model binding approach described herein bases many such validations on class (constructor) definitions to simplify the implementation of validation logic and reduce the likelihood of them drifting apart. The complexity of acceptable input strings (i.e., command lines) depends on the particular command involved. To assess the complexity of available command line input for a given command, one can often look at user manual information (a.k.a. "man page" in some environments). By a loose convention, namely, one that applies to some but not all command programs in various environments, entering a command program alone without any other arguments will display some help info, such as the purpose of the command program and the available subcommands.

For example, consider the source control command program git. Entering "git" alone on a command line yields a result such as the following:

```
$ git
usage: git [--version] [--help] [-C <path>] [-c name=value]
    [--exec-path[=<path>]] [--html-path] [--man-path] [--info-path]
    [-p | --paginate | --no-pager] [--no-replace-objects] [--bare]
    [--git-dir=<path>] [--work-tree=<path>] [--namespace=<name>]
    <command> [<args>]
```

These are common Git commands used in various situations:
    start a working area (see also: git help tutorial)
        clone Clone a repository into a new directory
        init Create an empty Git repository or reinitialize an existing one
    work on the current change (see also: git help everyday)
        add Add file contents to the index
        mv Move or rename a file, a directory, or a symlink
        reset Reset current HEAD to the specified state
        rm Remove files from the working tree and from the index
    examine the history and state (see also: git help revisions)
        bisect Use binary search to find the commit that introduced a bug
        grep Print lines matching a pattern
        log Show commit logs
        show Show various types of objects
        status Show the working tree status
    grow, mark and tweak your common history
        branch List, create, or delete branches
        checkout Switch branches or restore working tree files
        commit Record changes to the repository
        diff Show changes between commits, commit and working tree, etc
        merge Join two or more development histories together
        rebase Reapply commits on top of another base tip
        tag Create, list, delete or verify a tag object signed with GPG
    collaborate (see also: git help workflows)
        fetch Download objects and refs from another repository
        pull Fetch from and integrate with another repository or a local branch
        push Update remote refs along with associated objects
    'git help -a' and 'git help -g' list available subcommands and some concept guides. See 'git help <command>' or 'git help <concept>' to read about a specific subcommand or concept.

In this example, a $ serves as a command prompt from the command line interpreter. In some other environments, other prompts are displayed by a command line interpreter to indicate it is ready to receive a command line.

In this example, the user has invoked a command on a command line submitted to a command line interpreter, and the command is named "git". Upon receiving this command, the command line interpreter runs the git command program, which is to say, it runs the git command, an operation which can be stated even more briefly as "it runs git". Running this implementation of the git command, with no arguments supplied to the git command itself, displays help information. This display of help info is a default behavior of the git command when no other arguments are provided to the command line interpreter.

The git help output identifies several subcommands that will be recognized by git. Running one of these subcommands is accomplished by executing git with the subcommand as an argument to git, e.g. "git commit" or "git pull" or "git add". Referring to an item as an "argument" implicitly or explicitly identifies or assumes what the argument is an argument of. Context matters. In the case of "git commit" for example, the context of arguments may be either the command line interpreter, or the command git. There are two arguments to the command line interpreter ("git" and "commit") and one argument to the git command ("commit"). One of skill will understand the context in the examples herein. For the benefit of other readers, the context will generally be stated, e.g., using a phrase such as "command argument" or "subcommand argument".

Although "git commit", "git pull" and "git add" are each an invocation made via the git command, they do not share the git command's top-level behavior of showing help info when no further arguments are supplied. Instead, they use the same entry-point command (git) to provide a variety of independent services. For example, "git add" expects at least one additional argument, so entering "git add" and nothing else on the command line results in an error message:
    $git add
    Nothing specified, nothing added.
    Maybe you wanted to say 'git add.'?
Similarly, "git commit" with no further arguments does not simply display help info, but instead attempts to perform the commit subcommand of the git command:
    $git commit
    On branch dev/piotrp/betterPropTypes
    Your branch is based on 'origin/dev/piotrp/betterPropTypes', but the upstream is gone.
        (use "git branch—unset-upstream" to fixup)
    nothing to commit, working tree clean
Looking deeper at each of these subcommands by entering "git <command>—help" one can see that they have disparate options and other arguments:

```
$git add --help
SYNOPSIS
    git add [--verbose | -v] [--dry-run | -n] [--force | -f] [--interactive | -i]
[-- patch | -p]
        [--edit | -e] [--[no-]all | --[no-]ignore-removal | [--update | -u]]
        [--intent-to-add | -N] [--refresh] [--ignore-errors] [--ignore-
    missing]
        [--chmod=(+|-)x] [--] [<pathspec>...]
$git commit --help
    git commit [-a | --interactive | --patch] [-s] [-v] [-u<mode>]
[--amend]
        [--dry-run] [(-c | -C | --fixup | --squash) <commit>]
        [-F <file> | -m <msg>] [--reset-author] [--allow-empty]
        [--allow-empty-message] [--no-verify] [-e] [--author=<author>]
        [--date=<date>] [--cleanup=<mode>] [--[no-]status]
        [-i | -o] [-S[<keyid>]] [--] [<file>...]
```

Comparing these syntax summaries for git commit and git add, one sees that each subcommand expects zero or more tokens from the command line entered by the user. Under one view, suitable for processing a particular subcommand, a token is an option, an argument, or a subcommand; an option is an optional token; and an argument is input such as a filename, message text, mode label, date in text format, and the like. Under a more general view, however, commands, subcommands, options, subcommand arguments, and syntax markers such as the hyphen or double hyphen are all examples of command line arguments or portions thereof.

Comparing the tokens expected by git add and git commit, as described in the help text above, one sees that some tokens are applicable to both subcommands, such as:
—interactive
—patch Other tokens are unique to a particular subcommand. These include:
—dry-run
—squash In order for a command line parser to correctly validate and capture user inputs, the parser will distinguish various branches in the user's possible intents. A naive example familiar to many existing boilerplate implementations would be the following code snippet:

```
if (subCommand == 'add')
{
    accept '--interactive';
    accept '--patch';
    accept '--dry-run';
    reject '--squash';
}
else if (subCommand == 'commit')
{
    accept '--interactive';
    accept '--patch';
    reject '--dry-run';
    accept '--squash';
}
```

This code snippet shows that the parser, based on a token such as the command, will make context-sensitive decisions about subsequent tokens.

In the context of web applications whose architectures conform to a model-view-controller (MVC) pattern, "model binding" refers to mapping HTTP or HTTPS request data to a model. The data is converted from query string or form collection data to action method parameters. Thus, the MVC web application determines which action method to run based on what is in the routed request data (derived from the URL), and binds values from that data to the action method's parameters. This method is only callable after construction of an instance of some class, which is the Controller in the MVC pattern. This is analogous to the way some web frameworks invoke a controller, but parser embodiments described herein do not themselves need to follow the MVC pattern, nor is model binding universal to the MVC pattern.

In the present context of command line interpreters, "model binding" refers to mapping command line arguments to subcommands and subcommand arguments. Teachings herein support tools and techniques for implementing a kind of command line parser model binding that employs subcommand classes instead of relying on boilerplate. As used herein, "boilerplate" is exemplified in source code by large (dozens of branches) hand-coded switch statements or if-then-else statements or the like that are difficult for developers to maintain as the command or subcommand syntax expands or otherwise changes.

Model binding of some kind is useful, because an object representing the user's command line input will efficiently support developer productivity if the object is cognizant of the acceptable inputs for a given command and any relevant subcommands. For example:

```
class GitAdd{
    public bool Interactive;
    public bool Patch;
    public bool DryRun;
}
class GitCommit{
    public bool Interactive;
    public bool Patch;
    public bool Squash;
}
```

A Boilerplate Example Contrasted with Some Teachings

Once the parser has done input validation and generated an instance of one of these classes, however, some logic determines how to execute the user's intent with that object. When boilerplate code is used, such logic may look something like the following:

```
if (parseResult.GetType( ) == typeof(GitAdd))
{
    doGitAdd(parseResult);
}
else if (parseResult.GetType( ) == typeof(GitCommit))
{
    doGitCommit(parseResult);
}
```

The challenges posed by parsing complex command syntaxes like the syntax of a git command line can lead to a considerable amount of complicated boilerplate code. Such boilerplate code is error-prone, because of its inflexibility and the way it tightly couples parsing to subcommand dispatching in the if-then-else or switch statement.

By contrast, applying teachings herein can simplify the creation and maintenance of command line parsers for commands that accept complex and context-sensitive argument strings. The present teachings discuss a mechanism for expressing tokens acceptable to a given final command (whether it is a root command such as git or a subcommand such as git commit) by convention via the shape of an object that represents the command's acceptable input. Teachings herein also discuss a mechanism for composing a parser's command hierarchy through a registration of such input objects, a mechanism for associating a handler delegate for each input Type registered with the parser, and a runtime component that takes the user's arguments and a parser configuration and produces an invocation of the appropriate delegate with a fully hydrated input object argument. Some teachings reduce the complexity of command line applications by providing a structured software development model for converting an array of command-line arguments into materialized and actionable object representations of the user's intent. Other teachings are also provided.

An Additional Boilerplate Example and Related Teachings

For the benefit of readers who are familiar with C# ("C-sharp") and similar programming languages, additional examples of boilerplate and of innovative implementations are provided below. However, embodiments are not limited to implementations in C#. Other programming languages may also be used in embodiments, if they support specification and creation of the recited artifacts and constructs such as (sub)command classes and class constructors and default values.

Teachings provided herein can reduce or eliminate the use of complex boilerplate code that has commonly been used to define the parameters and behaviors for command line applications. Here is an example of typical command-line parsing and invocation code, broken into three tasks:

```
var parsedArgs = new Dictionary<string, string>( );
string currentOption = null;
foreach (var arg in args)
{
    if(arg.StartsWith("-"))
    {
        currentOption = arg;
        parsedArgs.Add(arg, null);
    }
    else if (currentOption != null)
    {
        parsedArgs[currentOption] = arg;
        currentOption = null;
    }
    else
    {
        // parse error
        return 1;
    }
}
// handle help requests, validation, etc.
/* ... */
```

// 2. Bind parsed arguments to the command invoker.

```
var invoked = new MyInvokedClass( );
if (parsedArgs.TryGetValue("-i", out var i))
{
    invoked.IntOption = int.Parse(i);
}
if (parsedArgs.TryGetValue("-s", out var s))
{
    invoked.StringOption = s;
}
if (parsedArgs.TryGetValue("-b", out var b))
{
    invoked.BoolOption = bool.Parse(b);
}
```

// 3. Call the invoked command and handle output and errors.

```
try
{
```

```
    command.Invoke( );
}
catch (Exception exception)
{
    Console.Error.WriteLine(exception);
    return 1;
    throw;
}
return 0;
}
```

Adding to this complexity of possible valid inputs, some command line interpreters recognize piping which directs (or redirects) input or output between commands, so a command line may recite the names of multiple commands. For instance, on some systems the command line "ls -a|head>somefiles" runs the ls command to list files in a directory, with an optional argument "a" indicating that all files (even normally hidden ones) should be listed, and then pipes the output of that command to the head command to keep only the first ten lines of the output, and then directs that into a file named "somefiles".

Boilerplate parser patterns are repetitive and error-prone, because the parsing and invocation are tightly coupled. In a moderately complex command line application having subcommands and many options, this boilerplate code is typically hundreds or thousands of lines.

A solution taught herein provides a mechanism to replace all three of these steps with a declarative syntax definition for the command line application. This reduces the above example to the following, with steps 1 (parsing) and 2 (binding) replaced by the parser and syntax definition, and step 3 (command invocation) provided by wrapping the user's invocation code, which will have been instantiated for them based on the command line arguments provided. One suitable implementation using this improved non-boilerplate approach looks like this:

```
public static int Main(params string[ ] args)
{
    var parser = new Parser(
        Option("-i", "<help text>", ExactlyOneArgument( )),
        Option("-s", "<help text>", ExactlyOneArgument( )),
        Option("-b", "<help text>", ZeroOrOneArgument( )))
    .InvokeAs<MyInvokedClass>(c =>
    {
        c.Invoke( );
    });
    var result = parser.Parse(args).InvokeAppliedCommand( );
    return result.ExitCode;
}
```

In this solution example, the appropriate constructor for the specified invoker class is called. Given the specified class definition, the types of the arguments can be inferred, removing the need for boilerplate code to test for argument presence and coerce types. Default values can be expressed using idiomatic C#, as illustrated in the following non-boilerplate code:

```
public class MyInvokedClass
{
    publicMyInvokedClass(int i = 5, string s = "<default value>", bool b = false)
    {
        IntOption = i;
        StringOption = s;
        BoolOption = b;
    }
    public int IntOption { get; }
    public bool BoolOption { get; }
    public string StringOption { get; }
    public void Invoke( )
    {
        // ...
    }
}
```

A further reduction in the parser details a developer must wrangle is available by inferring the parser configuration from the invoker class:

```
public static int Main(params string[ ] args)
{
    var parser = Parser.For<MyInvokedClass>( );
    var result = parser.Parse(args).InvokeAppliedCommand( );
    return result.ExitCode;
}
```

The argument names and subcommand names (if any) can be inferred from the invoker class's name and its parameter or property names. Additional complexity, such as aliases (e.g., -i vs—intOption) and help text metadata, can be provided in this scenario using attributes on the invoker class:

```
public class MyInvokedClass
{
    // ...
    [Option(HelpText = "<help text>",
        Aliases = "-i|--intOption")]
    public intIntOption { get; }
    // ...
}
```

Some embodiments taught herein use or provide a facility for automatically mapping a user's intentions, expressed as simple-text input, to actionable developer-defined types. Some use or provide a facility for expressing acceptable simple-text user inputs through intuitive conventions built atop existing code metaphors. Some use or provide a facility for automatically generating user-facing documentation through intuitive conventions built atop existing code metaphors.

Some embodiments described herein may be viewed in a broader context. For instance, concepts such as binding, classes, dispatching, executing, parsing, and textual communications may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving binding, classes, dispatching, executing, parsing, or textual communications are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Some embodiments address technical activities that are rooted in computing technology, such as defining classes in a source code, parsing command strings, and executing subcommands with default values. Some technical activities described herein support cleaner software design by reducing reliance on large (i.e., dozens of branches) if or switch statements for parsing and matching large if or switch statements for dispatching. Some encourage the use of in-code documentation by supporting use of class attributes for automatic generation of user-facing help info texts.

Some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein implement subcommand classes for command line parsing as disclosed herein.

Technical effects provided by some embodiments include more efficient development of command line parsers with fewer bugs arising from inconsistencies in boilerplate code, and greater ease sharing subcommand implementations between different commands by virtue of encapsulation in subcommand classes. For instance, subcommands may be shared by two commands that operate in the same way but have different names in different operating system environments. Also, in some environments the functionality of two commands overlaps and has not been separated out into a separate command, so that functionality can be placed in a subcommand class for more efficient maintenance and better storage usage.

Some embodiments disclosed herein include technical adaptations such as a subcommand class, an invocation of a subcommand class constructor, a class attribute defining argument aliases, a class attribute defining help text for a subcommand, inference of argument optionality from the presence of a default value in a subcommand class constructor, delegates which dispatch developer-defined subcommand types, or an interface implementation which dispatches a subcommand for execution.

Other advantages based on the technical characteristics of the teachings will also be apparent to one of skill from the description provided.

Acronyms and Abbreviations

Some acronyms and abbreviations are defined below. Others may be defined elsewhere herein or require no definition to be understood by one of skill.
ALU: arithmetic and logic unit
API: application program interface
APP: application
arg: argument
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HTTP: hypertext transfer protocol
HTTPS: hypertext transfer protocol secure
IDE: integrated development environment, sometimes also called "interactive development environment"
IP: internet protocol
MVC: model-view-controller software architecture pattern
OS: operating system
RAM: random access memory
ROM: read only memory
URL: uniform resource locator

Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "node" is an item with processing capability, access to at least one network, and a network address. Networked computer systems are examples of nodes. However, a networked computer system may include one or more nodes. For example, two server processes running on the same machine may each have control of a different respective NIC at a different respective network IP address, and thus operate as two different nodes. Similarly, two processes may share the same NIC hardware and the same IP address but operate from different ports as distinct nodes.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

The word "command" is sometimes used herein as a qualifier or to provide context, e.g., in phrases such as "command line", "command line interface", "command line interpreter", and "command line parser". When used alone, the word "command" refers to a command program, or to the name of a command program, according to the context. In the Microsoft PowerShell® environment, commands are also referred to as "cmdlets" (mark of Microsoft Corporation). As another example of terminology variations, with regard to what is expected on a command line, one of skill will acknowledge that "the command line begins with a command followed by zero or more command arguments" is equivalent to "the command line begins with a command program followed by zero or more command arguments" and to "the command line begins with the name of a command program followed by zero or more command arguments" and to "the command line begins with the name of a command followed by zero or more command arguments".

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"Service" means a consumable program offering in a cloud computing environment or other network environment.

"Programming language translator" (a.k.a. "translator") means a compiler, an interpreter, or another software program which translates computer programming language input into one or more of the following: an abstract syntax tree, assembly language, binary code, a different programming language, executable code, hardware description language, intermediate code, machine instructions, object code, p-code, or register transfer language.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. An operation such as parsing a command line which has thousands or even tens of thousands of syntactically correct variations using different subcommands and other arguments, for example, is understood herein as requiring and providing speed and accuracy that are not obtainable by human mental steps, in addition to its inherently digital nature (e.g., a human mind cannot interface directly with RAM or other digital storage to retrieve subclass definitions or invoke subclass constructors). This is understood by persons of skill in the art, but others may sometimes need to be informed or reminded of the facts.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as binding, building, calling, causing, compiling, configuring, decoupling, defining, directing, dispatching, employing, entering, furnishing, generating, including, inferring, instantiating, invoking, making, mapping, matching, obtaining, omitting, passing, performing, placing, producing, providing, receiving, recognizing, running, specifying, supplying, using, utilizing (and binds, bound, builds, built, calls, called, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium or digital storage medium is not a propagating signal or a carrier wave outside the scope of patentable subject matter under United States Patent and Trademark Office (USPTO) interpretation of the In re *Nuijten* case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, digital storage media including computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
    102 computer system, also referred to as computational system or computing system
    104 users
    106 peripherals
    108 network generally
    110 processor 112 computer-readable storage medium, e.g., RAM, hard disks
114 removable configured computer-readable storage medium
116 instructions executable with processor; may be on removable media or in other memory (volatile or non-volatile or both)
118 data
120 kernel(s), e.g., operating system(s), BIOS, device drivers
122 tools, e.g., source code editors, compilers and other programming language translators, integrated development environments, operating system utilities, anti-virus software, network administration software
124 applications, e.g., word processors, web browsers, spreadsheets
126 display screens
128 computing hardware not otherwise associated with a reference number 106, 108, 110, 112, 114
202 command line interface, a.k.a. command line interpreter or console
204 command line, namely, a line of text input to a command line interface; may include line continuation characters to extend over multiple physical lines
206 command, a.k.a. command program, being any program that accepts command line arguments, e.g., many operating system utilities, most if not all compilers (and other development tools such as linkers, profilers, and debuggers), all command line interpreters, and many applications
208 command arguments, namely, arguments to a command; along with the command these are also arguments to the command line interpreter
210 subcommand
212 subcommand arguments namely, arguments to a subcommand; along with the subcommand these are also command arguments
214 piping, namely, input or output redirection tokens on a command line; some examples include vertical bar "|", greater than ">", less than "<", double greater than ">>", and double less than "<<" tokens in LINUX® environments (mark of Linus Torvalds).
300 command line parsing code
302 subcommand class
304 subcommand class name
306 subcommand class definition
308 subcommand class constructor
310 parameter of subcommand class constructor
312 default value of parameter of subcommand class constructor
314 class attribute defining help text (a.k.a. help info)
316 delegate used with subcommand class
318 interface implementation used with subcommand class
320 class attribute defining alias
322 mechanism (a.k.a. facility) for command line parsing
400 command line parser
402 instantiated subcommand class object
404 subcommand execution code portion of instantiated subcommand class object
500 development system—an example of a system 102
502 programming language translator
504 source code
506 main routine of a program
508 declarative syntax definitions, e.g., in examples herein, each of the following is a declarative syntax definition of a command line token:
Option("-i", "<help text>", ExactlyOneArgument( ))
IntOption=i;
510 command line token, e.g., command name, subcommand name, individual command argument, individual subcommand argument
512 results of executing command—depends at least on which individual command is executed, and what command arguments are given to the command; desired results are generally documented in man pages and other user manuals, and in help info
514 libraries used in building a program, such as standard I/O libraries and user-defined libraries
516 calls made, e.g., calls to subcommand class constructors
518 methods invoked (a.k.a. called)
520 documentation presented to user by or about a command
522 human developers of software, automated source code generators
524 compiler
600 method performed by a command
602 entering main routine of command, namely, controlling processor based on main routine
604 generating help info, either at top-level when no command arguments are provided on command line, or otherwise, e.g., by generating help text for a subcommand named on the command line
606 invoke a parser constructor; this may refer to the constructor of the invoked command class, or the constructor of a Parser class itself, depending on context
608 instantiate a subcommand class object, a.k.a. subcommand object
610 call a command line parser, e.g., by invoking an application from the command line or by invoking a parser implementation from within the application code
612 run (a.k.a. execute) subcommand execution code
700 method performed by a command line parser; may be part of a method 600 performed by a command which contains the parser
702 match a command argument to a subcommand name, e.g., by string comparison
704 invoke a subcommand class constructor; if successful, this will instantiate 608 a subcommand class object
706 dispatch processor control to a subcommand object's execution code, namely, pass control of processor to that code
800 method performed by a human or automated code generator to generate source code which describes a command line parser that uses subcommand classes
802 configure source code as translator input, e.g., by following syntax conventions of C# or another programming language that supports objects
804 provide command line parsing code that will be reachable through a main routine after translation; this is at least part of the code whose translation (e.g., compilation and linking) will form the command line parser
806 include in the source code a declarative syntax definition of a command line token
808 configure a subcommand class constructor, e.g., at least by specifying any default values
810 supply a call to a subcommand class constructor in the source code
900 method performed by a system to build a command program from source code and libraries 902 obtain subcommand class definitions, e.g., by opening a file which contains source code which contains the subcommand class definitions
904 receive command line parser source code, e.g., by reading the source code from a file containing the source code
906 cause a compiler to compile source code into executable parser code, e.g., by passing control to the compiler with the name of the file containing the source code
908 compile source code
910 direct a builder to build the program, e.g., by passing control to a linker or makefile which gathers the components of the program and integrates them with one another to form an executable program
912 build the program
914 produce the program, e.g., complete the building 912 process
1000 flowchart
1002 define a subcommand class, e.g., by generating source code which defines the subcommand class to a programming language translator
1004 recognize subcommand arguments, e.g., by model binding the argument values to subcommand class constructor parameters
1006 invoke a command on a command line
1008 decouple parsing from invocation, e.g., by not relying on close correspondence between a large parsing if or switch statement and a large dispatching if or switch statement as the example boilerplate code does
1010 specify parsing via subcommand class definitions
1012 perform invocation using subcommand class constructors
1014 infer subcommands from parser code, e.g., by treating each subcommand class as corresponding to a respective subcommand
1016 furnish help text to a user
1018 place a help text attribute in source code
1020 employ a single method to invoke all subcommand class constructors
1022 use an interface implementation for subcommand dispatch
1024 utilize a delegate for subcommand dispatch
1026 pass a subcommand type as an object
1028 pass a subcommand type as a generic argument
1030 make an argument an option
1032 option
1034 make an argument required for proper execution of a subcommand
1036 provide a default value in a subcommand class constructor
1038 omit a default value from a subcommand class constructor list of parameters
1040 map a user's intention—as expressed in a command line—to a subcommand class
1042 place an alias attribute in source code
1044 omit a parser root level type Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated. A GUI may include integrated NUI or voice command functionality, for example. A GUI may be generated on a local desktop computer, or on a smart phone, for example, or it may be generated from a web server and sent to a client device 102.

Natural user interface (NUI) operation may use peripherals 106 or other hardware 128 for speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

System administrators, network administrators, software developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more digital storage such as computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor any other digital storage medium is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Figure 2:
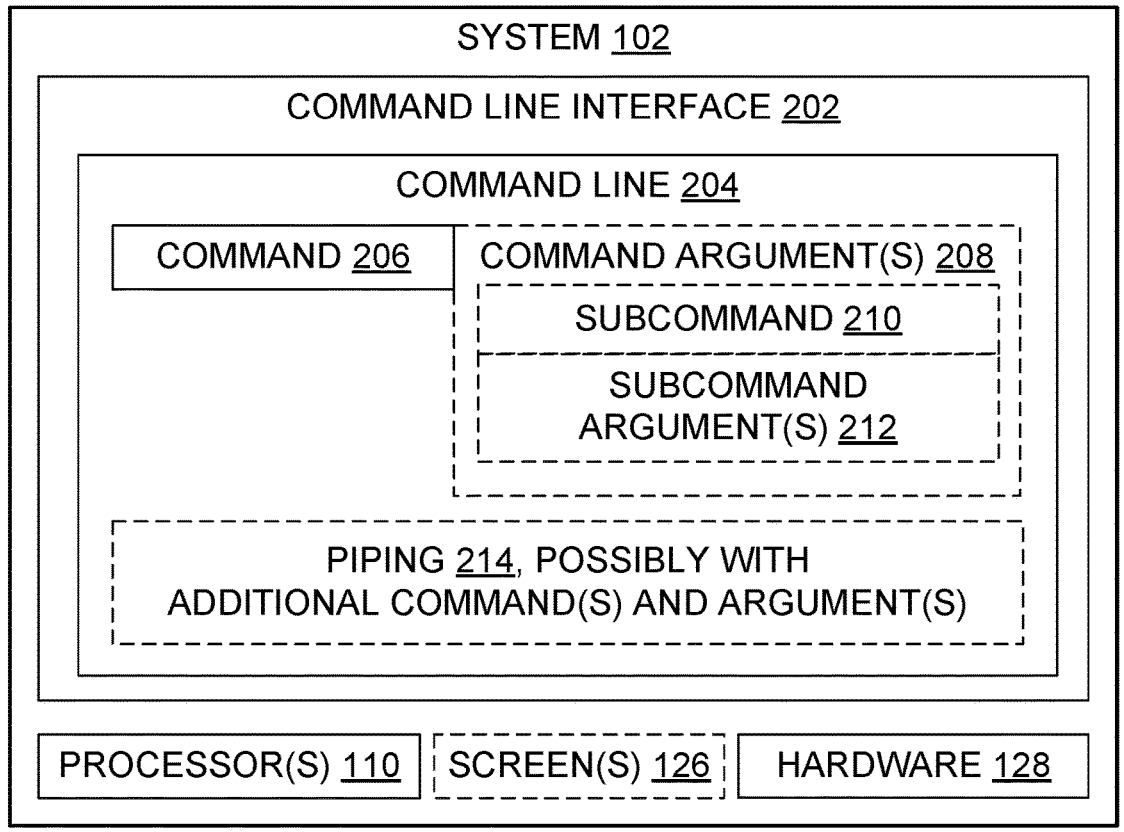
FIG. 2 is a block diagram illustrating aspects of a system having a command line interface whose implementation details, at least as to whether subcommand classes are involved, are transparent to an end-user that submits command lines to the command line interface.

With reference to FIG. 2, some systems 102 include a command line interface 202 which accepts a command line 204 from a user in the form of a text string and then uses processors 110, memory 112, and other hardware 128 to operate as instructed by the command line. In many cases, the command line is entered by a human user through a keyboard and displayed on a screen to the human user. However, the command line may also be transmitted over a network or read from disk, for example, by a computing process or other automated user, in which case a screen 126 will not necessarily be present, and might not be used even if it is present.

The command line itself 204 contains at least one command 206, with zero or more command arguments 208. Command arguments of particular interest here include subcommands 210, which may have zero or more of their own subcommand arguments 212. For instance, in the command line "git add." "git" is a command, "add" and "." are command arguments, "add" is a subcommand, and "." is a subcommand argument. Some command line interfaces 202 recognize piping 214 as arguments, such as "|", and thereby allow a valid command line to contain more than one command, e.g., "ls|head" pipes the result of a directory listing command "ls" into a command "head" that displays the first ten lines of the result.

Figure 3:
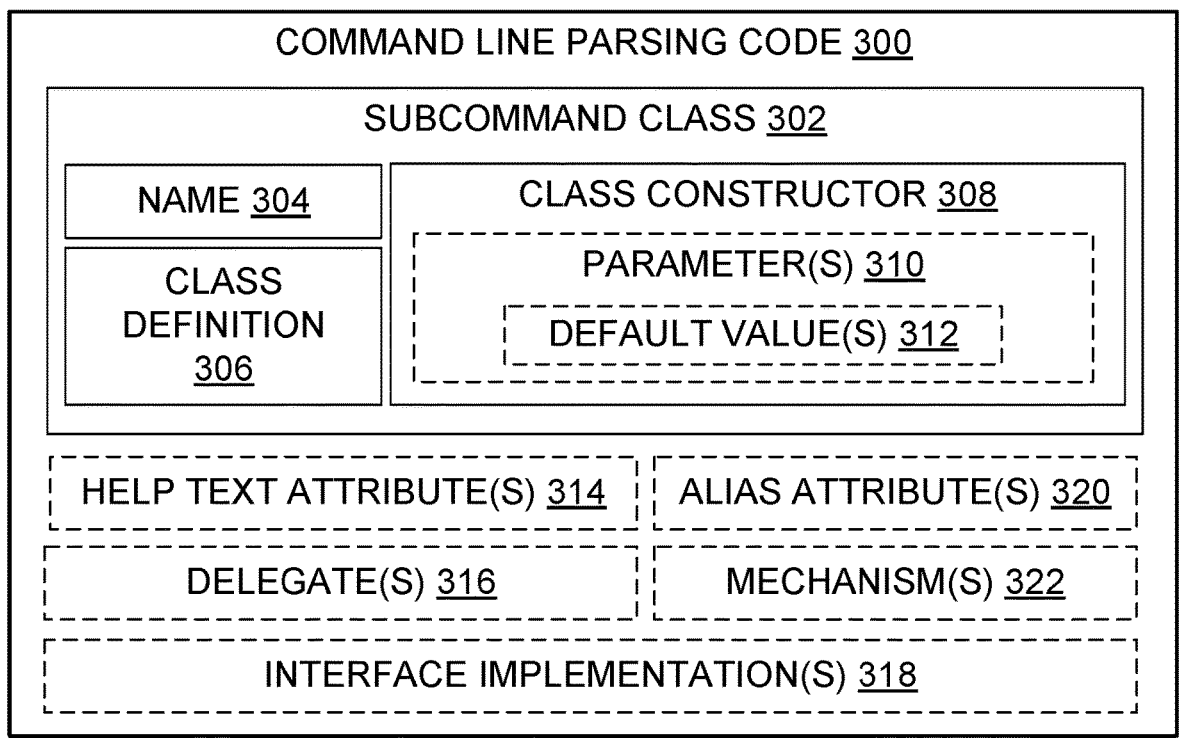
FIG. 3 is a block diagram illustrating aspects of command line parsing code which includes subcommand class artifacts.
Figure 4:
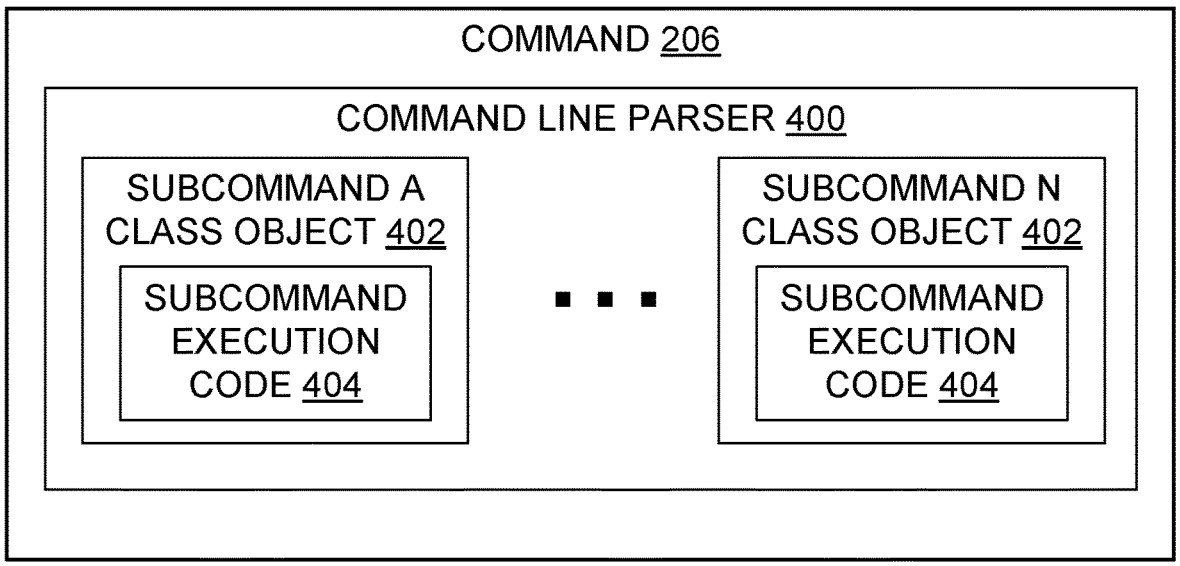
FIG. 4 is a block diagram illustrating aspects of a command program which includes a command line parser implemented with subcommand classes.

With reference to FIGS. 3 and 4, some systems 102 include command line parsing code 300 which implements part or all of a command line parser 400. The code 300 may be source code, compiled code, or a mixture of source and compiled code, for example, while the parser 400 is compiled or otherwise executable code. The command line parsing code 300 includes one or more subcommand classes 302. Each subcommand class has a class name 304, a class definition 306, and a class constructor 308; one of skill recognizes these as artifacts or constructs used in object-oriented programming. In particular, the parser 400 instantiates or otherwise includes subcommand class objects 402 for respective subcommands. The class constructor 308 has zero or more parameter values 310, each of which might have an assigned default value 312. A given subcommand class 302 may have zero or more associated attributes, including in particular attributes 314 that define help text and attributes 320 that define command argument aliases. Delegates 316 or interface implementations 318 or both might also be present as part of a mechanism for dispatching to subcommand execution code 404 to execute computations that perform the subcommand in question.

Figure 5:
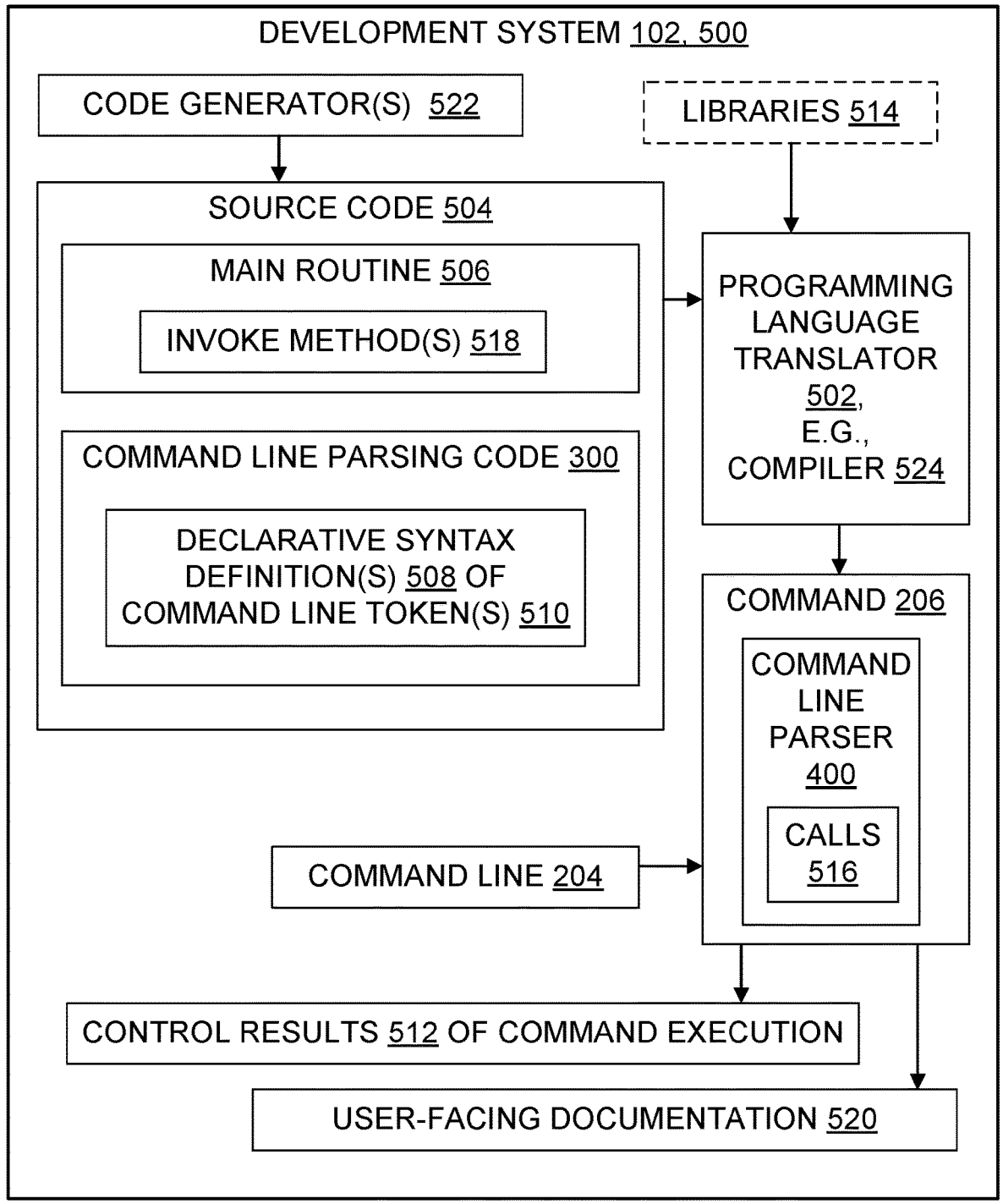
FIG. 5 is a flow diagram illustrating system, artifact, and workflow aspects of a creation and usage of a command program which includes a command line parser implemented with subcommand classes.

FIG. 5 illustrates development and use of a command line parser 400. The illustrated system 102 is a development system 500, namely, a system 102 which has source code 504 from one or more code generators 522, and has tools 122 such as a compiler 524 or other programming language translator 502 for transforming the source code 504 and libraries 514 into an executable command line parser 400 to run on the system 500. The source code 504 includes a main routine 506 with one or more parsing invocation methods 518, and command line parsing code 300 with declarative syntax definitions 508 of command line tokens 510. One of skill will understand that the executable command line parser 400 may also make calls 516, produce results 512, generate help info 520, and otherwise execute on systems 102 which are not necessarily development systems 500.

Some embodiments use or provide a system with an innovative command line parser as taught herein. One such system 102 includes at least one processor 110, a memory 112 in operable communication with the processor, and a command line interface 202 which is configured to accept a command 206 on a command line 204 together with zero or more acceptable command arguments 208 on the command line and then pass control to a command line parser 400 of the command. In this example, a set of acceptable command arguments includes at least two subcommands 210 which have at least two subcommand class definitions 306. Each subcommand class definition defines 1002 a subcommand class 302 having a respective subcommand class name 304 and corresponds to a respective subcommand 210 of the command 206. Each subcommand 210 in this example recognizes 1004 a set of one or more subcommand arguments 212. In this example, at least one of the subcommands upon execution recognizes 1004 a subcommand argument that is not recognized by at least one other of the subcommands.

In this example, the command line parser 400 resides in the memory, and upon execution by the processor performs a process that includes (a) matching a textual command argument of the acceptable command arguments to one of the subcommand class names 304 and thus to one of the subcommand classes 302, (b) invoking a constructor 308 of the matched subcommand class to instantiate a subcommand class object 402 of the matched subcommand class, and (c) dispatching processor control to a subcommand execution code 404 of the subcommand class object to thereby execute the subcommand 210.

In some embodiments, invoking the constructor of the matched subcommand class includes inferring a subcommand argument type from the subcommand class definition of the matched subcommand class.

In some embodiments, at least one of the subcommand class definitions defines a default value 312 for a parameter 310 of the corresponding subcommand class constructor, and the command line parser 400 treats the parameter as an optional subcommand argument.

In various embodiments, the command line interface 202 includes at least one of the following: an operating system 120 command line interface, a console user interface, an application program 124 command line interface, a command line interface which is at least partially wrapped by a graphical user interface, an operating system command shell, a command language interpreter, a script interpreter, a web browser uniform resource locator reader, a web search engine search criteria reader.

In some embodiments, the command line parser 400 includes at least one of the following: a mechanism 322 composed of constructs described herein which automatically maps 1040 a command user's intentions expressed as simple-text input 204 to actionable developer-defined types in the form of subcommand classes 302; a mechanism 322 which automatically dispatches developer-defined types in the form of subcommand class definitions 306 to developer-defined handlers in the form of subcommand execution code 404.

Methods

Figure 6:
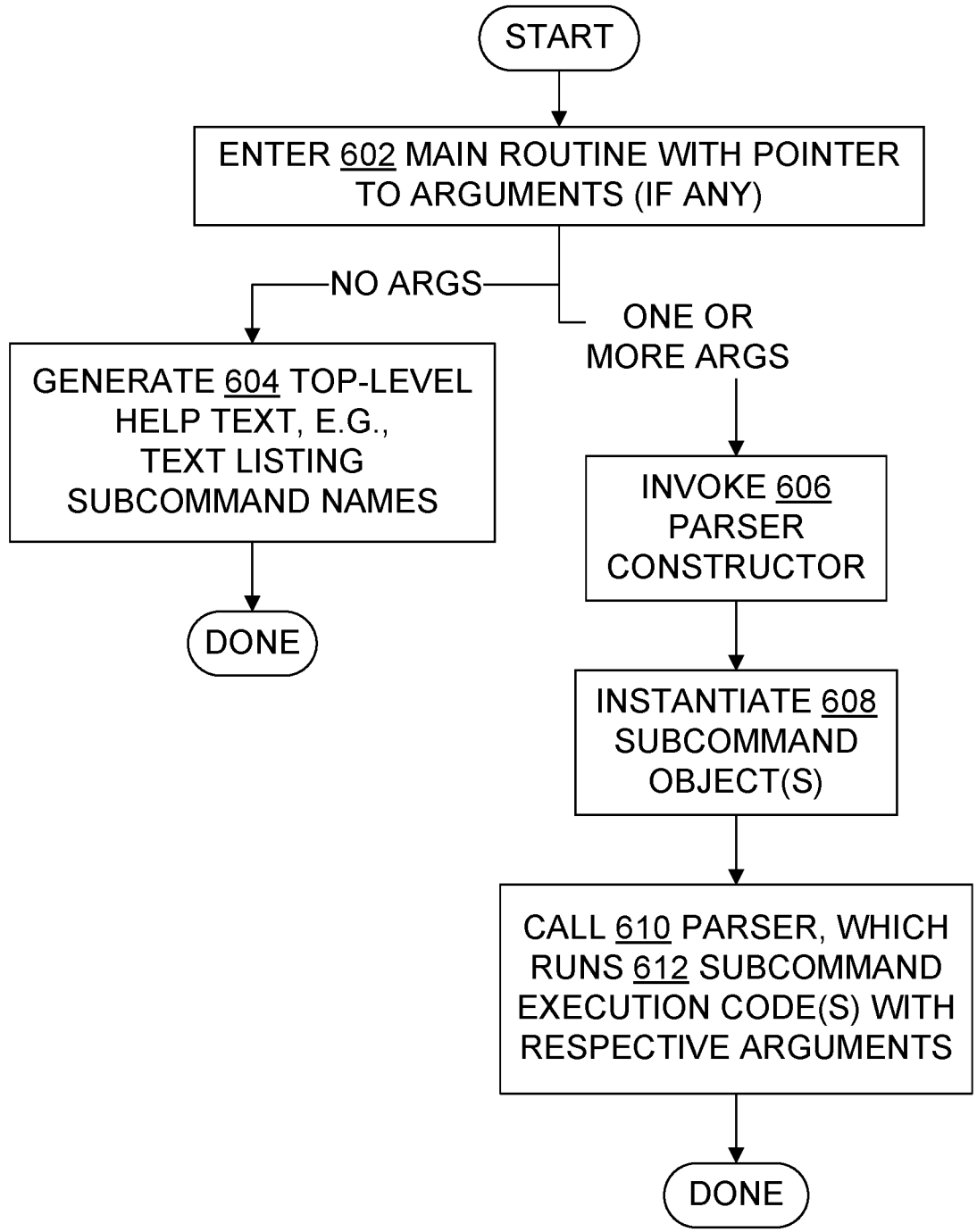
FIG. 6 is a flowchart illustrating a method performed by a command program which has a command line parser implemented with subcommand classes.

FIG. 6 illustrates a command line parsing method 600 performed by a command 206 using subcommand classes as taught herein. The command enters 602 its main routine. In several examples herein, the main routine is labeled "Main" but that convention need not be followed in every embodiment. If no command arguments are present, e.g., if the command line is merely the command itself (e.g., "git" alone as opposed to "git add" or "git commit"), then this example method treats the command line as a request for help info about the command and generates 604 user-facing documentation accordingly. Other commands may operate differently, e.g., "ls" entered alone on the command line displays a list of files in a current working directory, and "ipconfig" alone displays IP configuration data. To get help info for ipconfig, use "ipconfig -help" or "ipconfig -h" ("help" and "h" are aliases of one another). However, at least two approaches to help text are possible: the FIG. 6 approach which only gives help text when no subcommand args are present, and a most-specific-subcommand approach. Under the most-specific-subcommand approach, the generation of help text can typically also be specified using a help option and this is also context-sensitive with regard to the current subcommand as determined by the parser. For example, the help text returned by each of these will be for the most-specific subcommand: "dotnet -h" (help with dotnet), "dotnet add -h" (help with dotnet add), "dotnet add package -h" (help with dotnet add package).

If one or more command arguments are supplied, then at block 606 the command invokes 606 a parser constructor. In some examples herein, this looks something like one of the following, but other programming languages and other specific invocations may be used in other embodiments:

```
var parser = new Parser( )
    .WithCommand<Add>(addArgs => {
    if (add.DryRun){...}
    }) // ...
var parser = new Parser(
    Option("-i", "<help text>", ExactlyOneArgument( )),
    Option("-s", "<help text>", ExactlyOneArgument( )),
    Option("-b", "<help text>", ZeroOrOneArgument( ))) // ...
```

Parser constructor invocation 606 leads to instantiation 608 of subcommand objects 402 as command line tokens are parsed. Then the constructed parser with its instantiated subcommand objects is called 610, which runs 612 subcommand execution code(s) 404 matching the subcommand(s)

that are present in the command line. For example, the command line "git add." would invoke 606 a parser constructor, instantiate 608 an "add" subcommand object, and then run 612 the "add" class execution code to add the current directory (".") to the git repository.

Figure 7:
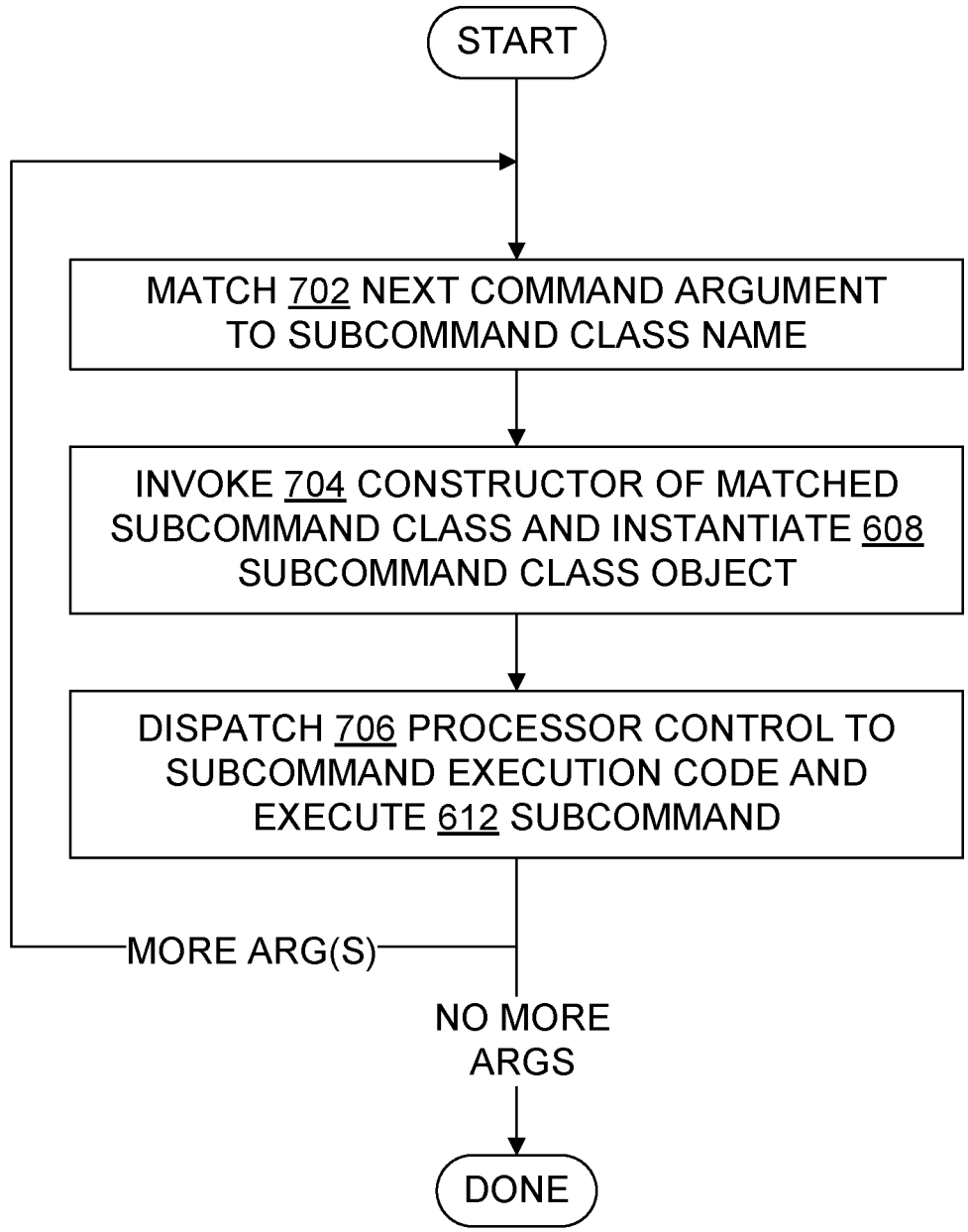
FIG. 7 is a flowchart illustrating a method performed by a command line parser implemented with subcommand classes.

FIG. 7 illustrates a command line parsing method 700 performed by a command line parser. The parser matches 702 a command argument to a subcommand name, e.g., by matching "add" to the git subcommand add. Then the parser invokes 704 a constructor for the matched class and instantiates 608 an object 402 of that subcommand class. Then the parser dispatches 706 control of the processor 110 to the object's subcommand execution code, which executes 612 the subcommand, e.g., in the case of "add" by adding a directory to a git repository. This sequence repeats if additional subcommands are present. It is contemplated that typically, and likely optimally, only the most-specific subcommand's implementing class is instantiated and invoked. In some embodiments, only a single subcommand will be selected for execution and parsing per se is complete by the time the subcommand class is selected and arguments bound.

Figure 8:
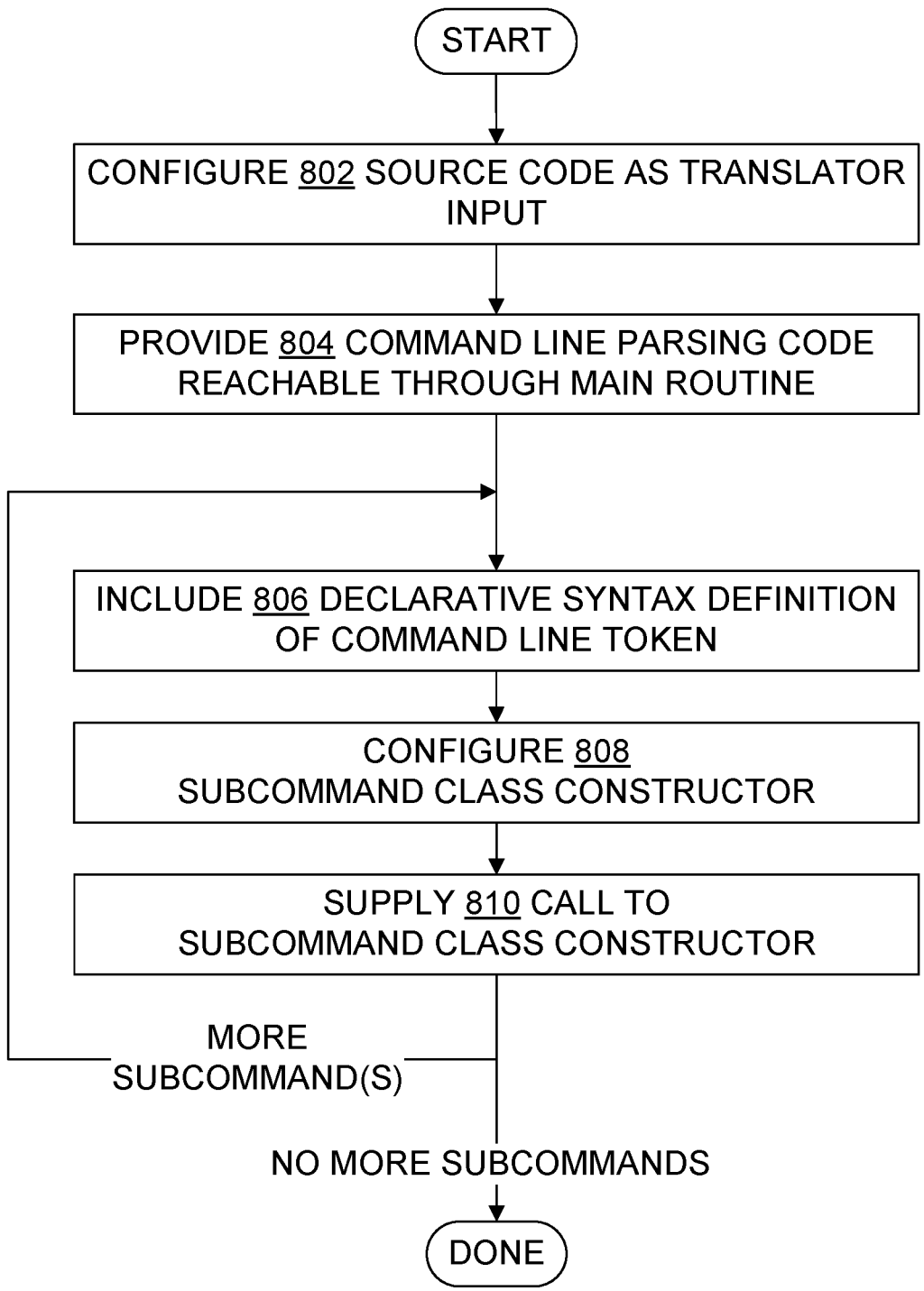
FIG. 8 is a flowchart illustrating a method performed by a developer or other source code generator to specify a command line parser implemented with subcommand classes.

FIG. 8 illustrates a command line parser development method 800 performed by a software developer or other source code generator, specific to subcommand-class-based parser development. The generator configures 802 the source code as translator input, e.g., by putting it in a file named in a makefile or IDE project file as code to be compiled. The source code includes (and thus the method provides 804) command line parsing code that is reachable, in this example, through the command's main routine. For each subcommand that is to be recognized by the command, or at least for a plurality of such subcommands, this method includes 806 a declarative syntax definition of a command line token denoting the subcommand, and configures 808 the constructor of the subcommand's class with any default values, and supplies 810 in the source code a call to the constructor. Some embodiments omit the looping shown in FIG. 7, or the looping shown in FIG. 8, or both. In some embodiments, it is a goal to complete all parsing before performing any invocation of command classes, thereby providing better decoupling and improved testability. Some embodiments parse more than once during a single command line invocation. In some embodiments, the most-specific subcommand will be the one invoked. Its parent commands do not need to be invoked. For example, "dotnet add -h" instantiates and invokes a class that is specified for the "add" subcommand, whereas "dotnet add package -h" instantiates and invokes the class specified for the "package" subcommand of the "add" subcommand.

Figure 9:
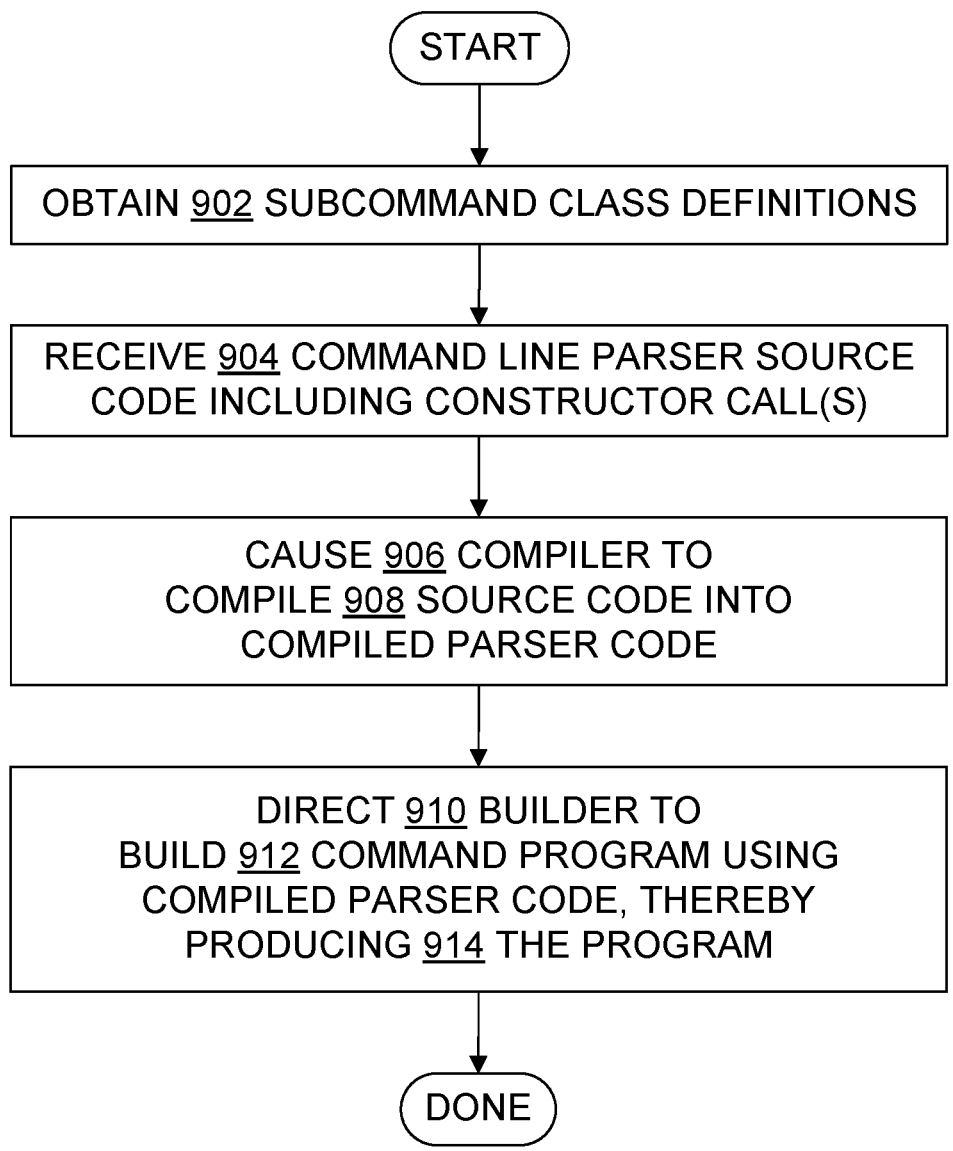
FIG. 9 is a flowchart illustrating a method performed by a system to build a command program having a command line parser implemented with subcommand classes.

FIG. 9 illustrates a method performed by a system to build a command program with a subcommand-class-based parser as taught herein. The system obtains 902 subcommand class definitions, e.g., by reading a file that contains them. The system receives 904 command line parser source code, which contains one or more subcommand class definitions and matching subcommand class constructors. Then the system causes 906 (e.g., by using a system command shell) compilation 908 of the source code and otherwise directs 910 an IDE or other program builder to compile and link code, thereby producing 914 the command program with its subcommand-class-based parser.

Figure 10:
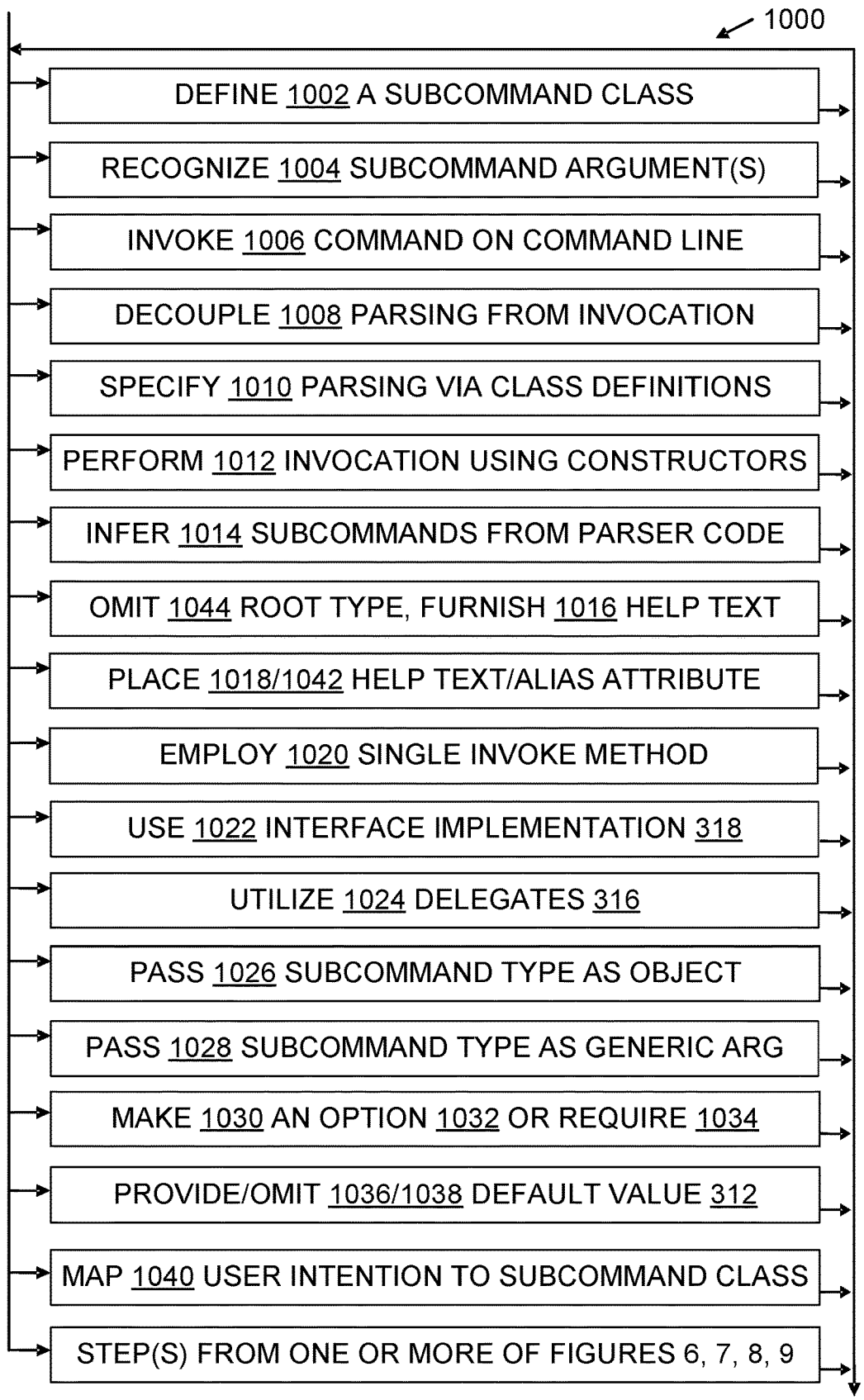
FIG. 10 is a flowchart further illustrating steps in some methods involving a command line parser with subcommand classes.

FIG. 10 illustrates some method embodiments in a general flowchart 1000. Technical methods shown in the Figures or otherwise disclosed will be performed automatically, e.g., by an IDE 122 or by a command line interpreter 202, unless otherwise indicated. Methods may also be performed in part automatically and in part manually to the extent action by a human administrator or other human person is implicated, e.g., a person may type a command and arguments on a command line of a command interpreter and hit the enter key to thereby cause performance of a method consistent with flowchart 1000. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIG. 10. Steps may be performed serially, in a partially overlapping manner, or fully in parallel. The order in which flowchart 1000 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Some embodiments use or provide a method for developing a command line parser. One example is a method of specifying, to a programming language translator in a computing system, a command line parser for a software application. The software application is configured to be invoked 1006 as a command on a command line together with zero or more command arguments on the command line. This method includes providing 804 a command line parsing code in a source code of the software application, with the source code configured as input to the programming language translator for translation upon execution of the programming language translator. In this example, at least a portion of the command line parsing code is reachable during execution of the software application through a main routine of the software application. Also, in this example the command line parsing code includes 806 one or more declarative syntax definitions of one or more command line tokens, with each command line token derived from one or more of the command arguments.

This example method also includes supplying 810 through the command line parsing code a call to an invoked class constructor for constructing an instance of an invoked class, with the invoked class matching a subcommand of the command. The invoked class constructor is configured 808 to accept one or more parameters. The invoked class instance has subcommand execution code which upon execution by at least one processor performs instructions implementing the subcommand.

In some embodiments, the command line parsing code includes a plurality of invoked classes having respective class names, and the class names are verbs which designate respective subcommands of the command and which are recognized as said subcommands after their inclusion as command arguments on the command line.

In some embodiments, the method includes at least one of the following: making 1030 at least one of the invoked class constructor parameters a command line option 1032 by providing 1036 in the command line parsing code a default value for the parameter, or making 1034 at least one of the invoked class constructor parameters a command line required argument by omitting 1038 from the command line parsing code any default value for the parameter.

In some embodiments, the method includes providing 1042 a command line argument alias in an attribute on a class.

In some embodiments, the method includes providing in the command line parsing code a parser configuration code (i.e., source code) which passes 1028 a subcommand type as a generic argument.

In some embodiments, the method includes providing in the command line parsing code a parser configuration code (i.e., source code) which passes 1026 a subcommand type as an object 402 of the subcommand type.

In some embodiments, the method includes omitting 1044 a parser root level type, thereby configuring the command line parser to merely print 1016 help information when the command is invoked with zero command arguments on the command line. Some embodiments configure the command line parser to automatically generate 604 user-facing documentation for each of a plurality of subcommands. Some furnish 1016 a help text by placing 1018 an attribute 314 on the invoked subcommand class.

In some embodiments, the method includes utilizing 1024 delegates 316 to dispatch developer-defined subcommand types to developer-defined subcommand handlers 404. In some, the method includes using 1022 an interface implementation 318 to dispatch a subcommand to instructions 404 implementing the subcommand. Some methods employ 1020 a single invoke method to dispatch each of a plurality of subcommands to respective instructions implementing the subcommand.

Some methods then build 912 the software application, with the command line parsing code including multiple invoked class constructors for respective invoked classes that match respective subcommands.

Some embodiments use or provide a method 900 for building a program with a command line parser without relying on parser code which tightly couples command parsing to command invocation. The method can be executed by a computing system having at least one processor and having a memory in operable communication with the processor. In this example, the method includes obtaining 902 at least two subcommand class definitions, with each subcommand class definition defining a subcommand class having a respective subcommand class name and corresponding to a respective subcommand. Each subcommand has a subcommand class constructor. Each subcommand recognizes a set of one or more subcommand arguments, and in this example at least one of the subcommands recognizes a subcommand argument that is not recognized by at least one other of the subcommands.

This method also includes receiving 904 a command line parser source code which includes calls to respective subcommand class constructors for constructing respective subcommand class objects based on the subcommand class definitions. Then this method causes 906 a compiler to compile 908 the command line parser source code into compiled command line parser code; this may be accomplished using a familiar compiler for C#, C++, Objective-C, or another familiar object-oriented programming language. Then this method directs 910 a program builder to build 912 the program using the compiled command line parser code, thereby producing 914 the program. The program 206 is built to be invoked as a command on a command line together with zero or more command arguments on the command line, each subcommand being a command line argument. In this example, the program is built to decouple 1008 command parsing from command invocation by specifying 1010 command parsing via the subcommand class definitions and by performing 1012 command invocation using the subcommand class constructors based on command arguments on the command line.

In some embodiments, the method builds 912 a command having at least three subcommands which each have at least two subcommand arguments, and at least one of the subcommand arguments of at least one of the subcommands is optional.

In some embodiments, the method builds 912 a command which automatically generates 604 user-facing documentation in part by inferring 1014 available subcommands from the compiled command line parser code. Each subcommand class (marked as such by an attribute or naming convention, for example) corresponds to an available subcommand.

In some embodiments, the command line parser source code includes a call to a parser constructor, which is based on a parser class definition. Invocation of the parser constructor causes invocation of subcommand class constructors based on which command line arguments are found by the constructed parser.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as subcommand classes 302, help text attributes 314, alias attributes 320, configured constructors 308, and a subcommand-class-based command line parser 400, in the form of data 118 and instructions 116, read from a removable medium 114 and/or another source such as a network connection, to form a configured medium. The configured medium 112 is capable of causing a computer system to perform technical process steps for creating or using command line parsers as disclosed herein. The Figures thus help illustrate configured storage media embodiments and process embodiments, as well as system and process embodiments. In particular, any of the process steps illustrated in FIGS. 6 through 10, or otherwise taught herein, may be used to help configure a storage medium to form a configured medium embodiment.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Additional examples can be based on the discussion of git herein, with the understanding that the teachings provided also apply to other commands. Consider the following code 300 excerpts, denoted here as the Add-Commit Code Example:

```
[HelpText("Add file contents to the index")]
class Add{
    public Add(bool interactive = false,
```

```
            bool patch = false,
            bool dryRun = false)
    {
        Interactive = interactive;
        Patch = patch;
        DryRun = dryRun;
    }
```

[HelpText("Add modified contents in the working tree interactively to the index . . . ")]
    public bool Interactive;
    [HelpText("Interactively choose hunks of patch between the index and the work tree and add them to the index.")]
    public bool Patch;
    [HelpText("Don't actually add the file(s), just show if they exist and/or will be ignored.")]

```
        public bool DryRun;
    }
    class Commit{
        public Commit(bool interactive,
                bool patch,
                bool squash = false)
        {
            Interactive = interactive;
            Patch = patch;
            Squash = squash;
        }
        public bool Interactive;
        public bool Patch;
        public bool Squash;
    }
    public static void Main(string [ ] args)
    {
        var parser = new Parser( )
            .WithCommand<Add>(addArgs => {
                if (add.DryRun){...}
            })
            .WithCommand<Commit>(commitArgs => {
                if (commitArgs.squash){...}
            });
        return parser.Parse(args);
    }
}
```

This Add-Commit Code Example 300 illustrates an implementation of a subset of the git command line parser. The example takes advantage of the invention and exemplifies teachings noted herein.

In particular, this Add-Commit Code Example 300 illustrates a facility for expressing acceptable simple-text user inputs through intuitive conventions built atop existing code metaphors; this facility is expressed by the first two class definitions. Each represents a subcommand, with the name of the class being interpreted as the verb of the subcommand. By combining them with their parent command, they can also be viewed as defining commands. If the compiled application is called "git", for example, then these two classes would define commands called "git add" and "git commit". The classes each expose a constructor 308, with that constructor accepting a number of parameters 310. Some of these parameters have default values 312 provided, making them options. Others do not have default values, making them required arguments.

This basic scheme can be extended by one of skill to cover more advanced scenarios such as optional arguments. Thus, in the example code below, "bool squash=false" sets a constructor parameter default value and thereby indicates an optional parameter in C#, meaning the user doesn't need to specify it when calling the constructor; the received value will be false. This is mapped by convention to an optional token a.k.a., an option, meaning the user doesn't need to specify it on the command line. The other two parameters (interactive and patch) in the code in question are non-optional and thus will be specified in a call to the constructor, from which an embodiment infers that they also should be specified on the command line.

```
class Commit{
    public Commit(bool interactive,
            bool patch,
            bool squash = false)
    {
        Interactive = interactive;
        Patch = patch;
        Squash = squash;
    }
    public bool Interactive;
    public bool Patch;
    public bool Squash;
}
```

The Add-Commit Code Example 300 also illustrates a facility 322 for automatically mapping user's intentions, expressed as simple-text input, to actionable developer-defined types. This facility is exemplified in the "Main" method, and is accomplished through the configuration of the Parser object. Specifically, the parser is configured by being provided with the Types of the Command classes (Add and Commit in this example). In this example, the Types are passed 1028 via generic arguments, though other approaches can replace that implementation, such as passing 1026 Type objects. With the configuration in Main, the Parser knows that it supports both Add and Commit as a Subcommand (a.k.a. Sub Command). The Parser has access to the Metadata for those commands, including attribute values, allowing both deserialization and Help content generation. The Parser also is generated without a Type at the root level, which by convention in this example specifies that the root parser should simply print help information.

As to passing Type objects, one example includes the following code. The type arguments Add and Commit specifying target subcommand classes are specified inside < and > using C#'s generics syntax:

```
var parser = new Parser( )
    .WithCommand<Add>(addArgs => {
        if (add.DryRun){...}
    })
    .WithCommand<Commit>(commitArgs => {
        if (commitArgs.squash){...}
    });
```

In this example, passing Type objects would include offering another (probably coexisting) API something like this, with the use of typeof( ) to indicate object types:

```
var parser = new Parser( )
    .WithCommand(typeof(Add), addArgs => {
        if (add.DryRun){...}
    })
    .WithCommand(typeof(Commit), commitArgs => {
        if (commitArgs.squash){...}
    });
```

The Add-Commit Code Example 300 above also illustrates a facility 322 for automatically dispatching these developer-defined types to developer-defined handlers. This is also exemplified in the Main method, where it is represented by the delegates 316 passed to each WithCommand invocation. These delegates expect their argument to be of the same Type as the argument passed to the associated WithCommand method call. The invoked delegates will only be called if the parser matched the user's input to that delegate's argument.

One of skill will acknowledge that many implementations are possible. The above example uses delegates passed in during parser configuration. In the following example, code such as "addArgs=>{if(add.DryRun){ . . . } }" or "commitArgs=>{if(commitArgs.squash){ . . . } }" indicates use of a delegate (a delegate function) that will be invoked in the event that the command line input indicates that the related command has been specified by a user. In this case, the developer can put desired code for the command execution into the delegate, removing the restrictions of a convention-based approach or an interface-based approach.

```
var parser = new Parser( )
    .WithCommand<Add>(addArgs => {
        if (add.DryRun){...}
    })
    .WithCommand<Commit>(commitArgs => {
        if (commitArgs.squash){...}
    });
```

One could also provide Command objects (Add, Commit) to implement a method which will be automatically invoked either by convention (e.g., a method called "Invoke" that takes no parameters) or by interface implementation, and other programming techniques could also be used.

Code 300 with a method called Invoke that takes no parameters could look something like this:

```
class Commit{
    public Commit(bool interactive,
                  bool patch,
                  bool squash = false)
    {
        Interactive = interactive;
        Patch = patch;
        Squash = squash;
    }
    public bool Interactive;
    public bool Patch;
    public bool Squash;
    public void Invoke()
    {
        // code to actually perform the Commit goes here
    }
}
```

Code 300 for an interface implementation could look something like this:

```
class Commit: ICommand {
    public Commit(bool interactive,
                  bool patch,
                  bool squash = false)
    {
        Interactive = interactive;
        Patch = patch;
        Squash = squash;
    }
    public bool Interactive;
    public bool Patch;
    public bool Squash;
    public void Invoke( )
```

```
    {
        // code to actually perform the Commit goes here
    }
}
interface ICommand
{
    void Invoke( );
}
```

This Add-Commit Code Example 300 also illustrates a facility for automatically generating 604 user-facing documentation through intuitive conventions built atop existing code metaphors. The configuration performed in Main is sufficient to generate documentation that resembles the following:
git —help output
. . .
Name
   git
usage: git <command>
commands:
   add Add file contents to the index
   commit
. . .
The available commands are inferred from the WithCommand invocations. The detailed help text for "add" comes from the class-level attribute in the Add class. The Name comes from the running process.
git add—help
Name
   git add
Description
   Add file contents to the index
usage: git add [—Interactive][--Patch][—DryRun]
options:
   Interactive Add modified contents in the working tree interactively to the index . . .
   Patch Interactively choose hunks of patch between the index and the work tree and add them to the index.")]
   DryRun Don't actually add the file(s), just show if they exist and/or will be ignored
In this case, the options and command name are extracted from the Add class. The descriptions of the options come from the HelpText attributes. Since the commit class does not have such attributes, the descriptions would be omitted but the overall output would be the same. Developer gestures for providing help text are thereby greatly reduced, making the documentation task easier and more likely to be performed.

Claim Perspectives

In the present document and derivatives of it, claims presented may consider command line parsing from different perspectives. For instance, claims may be presented which are from the point of view of a system that includes a program built with the inventive parser. From an end-user's perspective the program may look the same as one built using a conventional parser, because the subcommand-class-based aspects of the implementation may be transparent to the end-user. However, with sufficient time and effort one could analyze a program that was built with such an innovative parser and disassemble it and determine that it uses classes to represent subcommand syntax and to implement the subcommands, instead of using boilerplate code. Other claims may be from the point of view of a software developer who is writing the program that will contain the innovative parser. These claims describe developer gestures. Still other claims may be from the point of view of the system that the software developer is working on as he or she writes and builds the program that will contain the parser.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 6-10 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system comprising:
at least one processor;
a memory in operable communication with the processor;
a command line interface which is configured to accept a command on a command line together with zero or more acceptable command arguments on the command line and then pass control to a command line parser of the command;
a set of acceptable command arguments including at least two subcommands;
at least two subcommand class definitions, each subcommand class definition defining a subcommand class having a respective subcommand class name and corresponding to a respective subcommand of the command, each subcommand recognizing a set of one or more subcommand arguments, at least one of the subcommands upon execution recognizing a subcommand argument that is not recognized by at least one other of the subcommands; and
the command line parser, residing in the memory, and which upon execution by the processor performs a process that includes (a) matching a textual command argument of the acceptable command arguments to one of the subcommand class names and thus to one of the subcommand classes, (b) invoking a constructor of the matched subcommand class to instantiate a subcommand class object of the matched subcommand class, and (c) dispatching processor control to a subcommand execution code of the subcommand class object to thereby execute the subcommand.

2. The system of claim 1, wherein invoking the constructor of the matched subcommand class comprises inferring a subcommand argument type from the subcommand class definition of the matched subcommand class.

3. The system of claim 1, wherein at least one of the subcommand class definitions defines a default value for a parameter of the corresponding subcommand class constructor, and the command line parser treats the parameter as an optional subcommand argument.

4. The system of claim 1, wherein the command line interface includes at least one of the following: an operating system command line interface, a console user interface, an application program command line interface, a command line interface which is at least partially wrapped by a graphical user interface, an operating system command shell, a command language interpreter, a script interpreter, a web browser uniform resource locator reader, a web search engine search criteria reader.

5. The system of claim 1, wherein the command line parser comprises at least one of the following:
  a mechanism which automatically maps a command user's intentions expressed as simple-text input to actionable developer-defined types in the form of subcommand classes;
  a mechanism which automatically dispatches developer-defined types in the form of subcommand class definitions to developer-defined handlers in the form of subcommand execution code.

6. A method of specifying to a programming language translator in a computing system a command line parser for a software application, the software application configured to be invoked as a command on a command line together with zero or more command arguments on the command line, the method comprising:
  providing a command line parsing code in a source code of the software application, the source code configured as input to the programming language translator for translation upon execution of the programming language translator, at least a portion of the command line parsing code reachable during execution of the software application through a main routine of the software application, the command line parsing code including one or more declarative syntax definitions of one or more command line tokens, each command line token derived from one or more of the command arguments; and
  supplying through the command line parsing code a call to an invoked class constructor for constructing an instance of an invoked class, the invoked class matching a subcommand of the command, the invoked class constructor configured to accept one or more parameters, the invoked class instance having subcommand execution code which upon execution by at least one processor performs instructions implementing the subcommand.

7. The method of claim 6, wherein the command line parsing code comprises a plurality of invoked classes having respective class names, and the class names are verbs which designate respective subcommands of the command and which are recognized as said subcommands after their inclusion as command arguments on the command line.

8. The method of claim 6, wherein the method comprises at least one of the following: making at least one of the invoked class constructor parameters a command line option by providing in the command line parsing code a default value for the parameter, or making at least one of the invoked class constructor parameters a command line required argument by omitting from the command line parsing code any default value for the parameter.

9. The method of claim 6, wherein the method comprises providing a command line argument alias in an attribute on a class.

10. The method of claim 6, wherein the method comprises providing in the command line parsing code a parser configuration code which passes a subcommand type as a generic argument.

11. The method of claim 6, wherein the method comprises providing in the command line parsing code a parser configuration code which passes a subcommand type as an object of the subcommand type.

12. The method of claim 6, wherein the method comprises omitting a parser root level type, thereby configuring the command line parser to merely print help information when the command is invoked with zero command arguments on the command line.

13. The method of claim 6, wherein the method comprises at least one of the following:
  utilizing delegates to dispatch developer-defined subcommand types to developer-defined subcommand handlers;
  using an interface implementation to dispatch a subcommand to instructions implementing the subcommand;
  employing a single invoke method to dispatch each of a plurality of subcommands to respective instructions implementing the subcommand.

14. The method of claim 6, further comprising configuring the command line parser to automatically generate user-facing documentation for each of a plurality of subcommands.

15. The method of claim 6, further comprising furnishing a help text by placing an attribute on the invoked class.

16. The method of claim 6, further comprising building the software application with the command line parsing code including multiple invoked class constructors for respective invoked classes that match respective subcommands.

17. A method for execution by a computing system having at least one processor and having a memory in operable communication with the processor, the method for building a program with a command line parser without relying on parser code which tightly couples command parsing to command invocation, the method comprising:
  obtaining at least two subcommand class definitions, each subcommand class definition defining a subcommand class having a respective subcommand class name and corresponding to a respective subcommand, each subcommand having a subcommand class constructor, each subcommand recognizing a set of one or more subcommand arguments, at least one of the subcommands recognizing a subcommand argument that is not recognized by at least one other of the subcommands;
  receiving a command line parser source code which includes calls to respective subcommand class constructors for constructing respective subcommand class objects based on the subcommand class definitions;
  causing a compiler to compile the command line parser source code into compiled command line parser code; and directing a program builder to build the program using the compiled command line parser code, thereby producing the program, the program built to be invoked as a command on a command line together with zero or more command arguments on the command line, each subcommand being a command line argument, the program built to decouple command parsing from command invocation by specifying command parsing via the subcommand class definitions and by performing command invocation using the subcommand class constructors based on command arguments on the command line.

18. The method of claim 17, wherein the method builds a command having at least three subcommands which each have at least two subcommand arguments, and at least one of the subcommand arguments of at least one of the subcommands is optional.

19. The method of claim 17, wherein the method builds a command which automatically generates user-facing documentation in part by inferring available subcommands from the compiled command line parser code.

20. The method of claim 17, wherein the command line parser source code includes a call to a parser constructor, based on a parser class definition, and invocation of the parser constructor causes invocation of subcommand class constructors based on which command line arguments are found by the constructed parser.

* * * * *